(12) United States Patent
Rapoport et al.

(10) Patent No.: US 8,224,525 B1
(45) Date of Patent: Jul. 17, 2012

(54) INDICATION OF ATTRACTION DOMAINS FOR CONTROLLED PLANAR MOTION OF A GROUND VEHICLE

(75) Inventors: Lev B. Rapoport, Moscow (RU); Alexander V. Pesterev, Moscow (RU)

(73) Assignee: Javad GNSS, Inc., San Jose, CA (US)

( * ) Notice: Subject to any disclaimer, the term of this patent is extended or adjusted under 35 U.S.C. 154(b) by 628 days.

(21) Appl. No.: 12/395,361

(22) Filed: Feb. 27, 2009

Related U.S. Application Data

(60) Provisional application No. 61/032,890, filed on Feb. 29, 2008.

(51) Int. Cl.
*A01B 69/00* (2006.01)

(52) U.S. Cl. .......... 701/41; 701/408; 701/34.2; 180/204

(58) Field of Classification Search .................... 701/41, 701/42, 206, 207, 213; 180/197, 204, 6.2; 280/211

See application file for complete search history.

(56) References Cited

U.S. PATENT DOCUMENTS

2008/0208454 A1    8/2008   Pesterev et al.

OTHER PUBLICATIONS

Boyd, S. et al. (19940, *Linear matrix inequalities in system and control theory*, SIAM, Philadelphia.

Pesterev, A. V. et al. (Sep. 2007). "Global Energy Fairing of B-Spline Curves in Path Planning Problems," *Proceedings of the ASME 2007 International Design Engineering Technical Conference & Computers and Engineering Conference IDETC/CIE 2007*, Las Vegas, Nevada, Sep. 4-7, p. 1-7.

Pyatnitskii, E. S. (1970) "Absolute Stability of Nonstationary Nonlinear Systems," *Automation and Remote Control*, 31:1-9.

Rapoport, L. B. (Jun. 1999). "Estimation of an Attraction Domain for Multivariable Lur'e Systems Using Looseless Extension of the S-Procedure," *In Proc. Amer. Control Conference*, San Diego, California, pp. 2395-2396.

Rapoport, L. B. and Morozov, Y. V. (Jul. 2008). "Estimation of Attraction Domains in Wheeled Robot Control Using Absolute Stability Approach," *Proceedings of the 17th World Congress: International Federation of Automatic Control*, Seoul, Korea, Jul. 6-11, pp. 5903-5908.

Rapoport, L. B. et al. (Sep. 2006). "Control of Wheeled Robots Using GNSS and Inertial Navigation: Control Law Synthesis and Experimental Results," *In Proc. ION GNSS 2006: The 19th International Technical Meeting of the Satellite Division*, Fort Worth, Texas, pp. 2214-2221.

*Primary Examiner* — Gertrude Arthur Jeanglaude

(74) *Attorney, Agent, or Firm* — Morrison & Foerster LLP

(57) ABSTRACT

A method and apparatus for operating a vehicle under manual or automatic steering mode is disclosed herein. An estimation of an attraction domain of stability is calculated for the vehicle using the vehicle's current position and orientation information relative to a target trajectory. If an unstable estimation of the attraction domain is determined, then the vehicle is operated in manual mode under control of an operator.

28 Claims, 8 Drawing Sheets

INDICATION OF ATTRACTION DOMAINS FOR CONTROLLED PLANAR MOTION OF A GROUND VEHICLE

CROSS-REFERENCE TO RELATED APPLICATIONS

This application claims priority to U.S. Provisional Patent Application No. 61/032,890 filed Feb. 29, 2008, the content of which is incorporated herein by reference in its entirety.

BACKGROUND

There are many applications, like road construction and agriculture, where a vehicle is automatically steered along a target path. At the current level of road construction technology, the positioning accuracy expected of working tools or implements may be several millimeters. To increase planting density in agriculture and to save water and fertilizer, agricultural implements should have a position accuracy level of a centimeter. These and other similar tasks are performed by wheeled robotized vehicles equipped with satellite and inertial navigation tools and controllers, which provide automatic steering along a predefined path.

Nevertheless, control of such a wheeled robot does not exclude manual steering. Presence of an operator is necessary for safety considerations, e.g., in the case where the vehicle meets an unexpected obstacle. Another, even more significant reason to switch to manual control is when the closed loop control system loses stability due to unexpected disturbances in the sensors, which takes the system out of the stability region. For these reasons, an unmanned vehicle cannot be guaranteed to stay on the predefined path and provide stable tracking using sensors alone, such as GNSS and inertial sensors.

Generally speaking, two kinds of problems arise in automatic control of wheeled vehicles: (1) planning of a target path and (2) automatic driving of the vehicle to the target path and stabilizing the motion along it. The first problem of planning a target path arises from the type of construction or agricultural task. The second problem is usually solved by synthesizing a control law that stabilizes the motion of the vehicle along the target path, the control law obtained when solving the first problem.

However, the control law obtained from planning a target path does not provide global stability. In studies of stability and attraction domain, state space representation is usually used. In the case of a wheeled robot, the state space vector is usually given by position, orientation, and steered wheel angle. Automatic driving along the target path is not guaranteed if the system starts from an initial state not belonging to the attraction domain in the state space. As a result, driving the vehicle into the attraction domain can be performed either manually or using another algorithm that differs from the control law. The vehicle must be equipped with a special indicator on the control panel to let the operator know when it is safe to switch to automatic control. If the system estimates its state as belonging to the attraction domain, the system switches the indicator lamp to a green light. Otherwise, if the system estimates its state as not belonging to the attraction domain, the indicator lamp is switched to a red light to signal to the operator that switching to automatic control may not be safe. The red light indicates that transient processes are unpredictable and asymptotic stability may be not guaranteed. More specifically, exponential rate of convergence may not be guaranteed. Hence, it follows that estimation of the attraction domain is important to establish safety of automatic control of robotic wheeled vehicles.

Thus, it would be beneficial to have an apparatus and method for the efficient control of safety indicators based on numerically efficient estimation of the attraction domain. It is clear that different applications demand different approaches to estimation, or even for definition of the attraction domains.

BRIEF SUMMARY

Satellite broadcast navigation signals, as well as techniques for processing such signals, have improved in recent years. GPS L5 signals, further deployment of GLONASS (Russian Global Navigation Satellite System), and upcoming GALILEO (future European system) offer significant improvement for accuracy and reliability in positioning. Combined with inertial sensors, satellite techniques may be used in automated vehicle navigation.

Embodiments of the invention are directed toward the automated navigation of a vehicle along a target trajectory. A set of linear, circular, or spline segments is stored in an electronic memory and is used as representation of a target path or trajectory to be traveled by a vehicle in the automatic mode. The target trajectory results from a path planning algorithm. One of the approaches to path planning has been considered in A. V. Pesterev et al., "Global Energy Fairing of B-Spline Curves in Path Planning Problems," Proceedings of the ASME 2007 International Design Engineering Technical Conference & Computers and Engineering Conference IDETC/CIE 2007, Sep. 4-7, 2007, Las Vegas, Nev., CD ROM. 7, p. DETC2007-35306.

The target path is constructed as a sequence of segments that has a curvature not exceeding a maximal value, say $\bar{u}$, coordinated with the maximal angle of rotation of the steered wheel.

The body of the vehicle has spatial extension. There is one specific point among all points of the body that may be referenced relative to the target trajectory. This specific point is referred to as a target point. In agriculture applications, this is the point where an implement is attached to the vehicle. In road construction applications, this is the point where a working tool is attached to the vehicle. The position of any point of the vehicle's body can be translated to the position of any other point of the vehicle's body provided that the orientation of the body is known. Let us assume, without loss of generality, that the target point is the middle point of the rear axis provided that the rear wheels are driving and front wheels are steering.

Using the target trajectory, instant position of the target point, instant orientation of the vehicle body, and instant angle of the steered wheels, processing logic generates directional control signal information used to control the steering of the vehicle having automatic navigation and control capability. In this manner, the target point of the vehicle follows the target trajectory with required accuracy. Said processing logic is often referred to as a control law. The instant position of the target point, current orientation of the vehicle body, and current steered wheels angle form the so-called state represented in the parametric state space (three-dimensional in this case). In embodiments of the invention, the directional control signal, also referred to as control or control signal, is generated in terms of the deviation of the current vehicle position from the target trajectory in the space state.

Deviation of the current state of the vehicle from the target trajectory is used by the control law for calculation of the control signal to be sent to the actuators of the steered wheels. Control signal inputs provide course corrections aimed at eliminating or reducing the deviation with a prescribed rate of convergence. Embodiments of the invention provide an efficient way of calculating control signals and/or synthesizing control laws.

Steered wheel actuators may respond immediately to the control inputs, or respond after some inertia caused by its internal dynamics. Accordingly, the control law can either take into account internal dynamics or inertial properties of the steered wheels actuators or not take into account dynamics of the actuator.

Dynamic response of the vehicle to the control signal is described by a set of differential equations in the state space. These equations reflect the physics and mechanics involved in describing the real vehicle system. These equations are non-linear due to the presence of elementary trigonometry functions such as sine and cosine, square root, and saturation function in the description of the vehicle system. Saturation function is used to model restrictions on the steered wheels angle. Steered wheel rotation angle is not allowed to exceed some specific value $\overline{\alpha}$ coordinated with the maximal value $\overline{u}$ of curvature.

Non-linearity in the description of the vehicle system makes it impossible to synthesize a control law that stabilizes motion to the target trajectory from an arbitrary initial state. In general, the control law does not guarantee stability of the closed-loop system that is starting its movement from arbitrary large deviations in the current state from the target trajectory. Given the control law, the permissible deviations form the so called attraction domain. In other words, the attraction domain comprises a set of the initial states from which the control law is able to drive the target point to the target trajectory with a prescribed rate of convergence. For large deviations, those that do not belong to the attraction domain, the convergence to the target trajectory is not guaranteed. Automatic control cannot be used for such large deviations. It is not safe to use automatic control for initial positions not belonging to the attraction domain. The same can be said for situations when disturbances affecting sensors or manual interference to the steering wheel drop the state out of the attraction domain. The operator of the vehicle needs to know whether it is safe to trust automatic control or whether it is better to take manual control to avoid collisions.

An estimation or interior approximation of the attraction domain is used to calculate one or more ellipsoidal approximations of the attraction domain associated with one or more sets of parameters of the control law. The control law may switch from one law to another, switching to more aggressive laws, as the vehicle gets closer to the target trajectory. The aggressive control near the target trajectory makes it possible to optimize the rate of convergence. In other words, the control law comprises an equation, algorithm, logic, or expression used to calculate a control signal. For example, a control law may comprise equation (20) discussed below. As the parameters of the control law change and/or the approximation of the attraction domain changes, the corresponding control signal appropriate to move and/or maintain the vehicle along the target trajectory changes. Accordingly, there may be more than one approximation of the attraction domain and/or control signals calculated in order to cause the vehicle to move along the target trajectory. Approximations of the attraction domains can be used to switch from one control law to another.

An indicator lamp is included on the operator control panel. The lamp lights up green if the current state belongs to the attraction domain. The lamp lights up red if the state does not belong to the attraction domain. When the indicator lamp is red, the operator should consider switching to manual control. The ellipsoidal approximations of the attraction domain can be stored in the memory of the controller and used to control the indicator lamp.

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined by the claims attached hereto.

BRIEF DESCRIPTION OF THE DRAWINGS

The exemplary embodiments will become more fully understood from the following detailed description, taken in conjunction with the accompanying drawings, wherein the reference numeral denote similar elements, in which.

The headings provided herein are for convenience only and do not necessarily affect the scope or meaning of the claimed invention.

DETAILED DESCRIPTION

Figure 1:
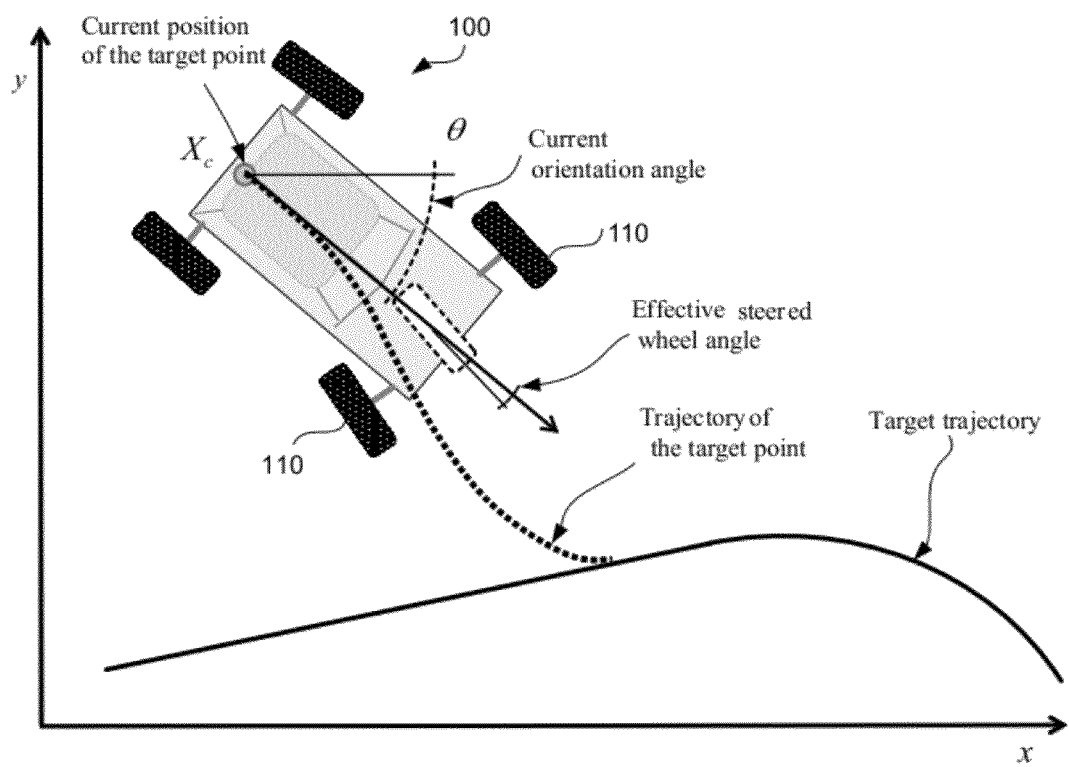
FIG. 1 is a kinematic scheme of the wheeled vehicle including description of the target trajectory and the parameters of the current state in accordance with embodiments of the invention.

Embodiments of the invention relate to the field of automated steering control of vehicles, such as, but not limited to, a ground or a land-based vehicle. Such a vehicle is depicted in FIG. 1 and discussed further below. Approximation of domains of guaranteed stability of closed-loop steering control is disclosed herein. Such approximation ensures safety for vehicle operation in the automated steering mode.

Domains of guaranteed rate of stability are also referred to as attraction domains in the state space. Parameters of the state include a full description of the position and orientation of the vehicle and is comprised of, but not limited to, the two-dimensional position of the target point on a plane, the orientation angle, and the steered wheel angle of the vehicle. FIG. 1 illustrates a vehicle 100 including a pair of front wheels 110 with target point, orientation angle, and effective steered wheel angle notations. Typically the angles of rotation of the two front wheels are not equal. To ensure circular movement without tire slippage, the inner (with respect to the turn orientation) wheel must be rotated more than the outer wheel. This difference in the angles is typically addressed by vehicle manufacturers by including specific mechanism(s) in the vehicles. The embodiments of the invention assume that this angle differential has been taken into account. It is assumed that the vehicle is equipped with a single effective steered wheel guaranteeing the same angular rate of change of orientation. The vehicle 100 illustrated in FIG. 1 assumes a single effective steered wheel.

Figure 6:
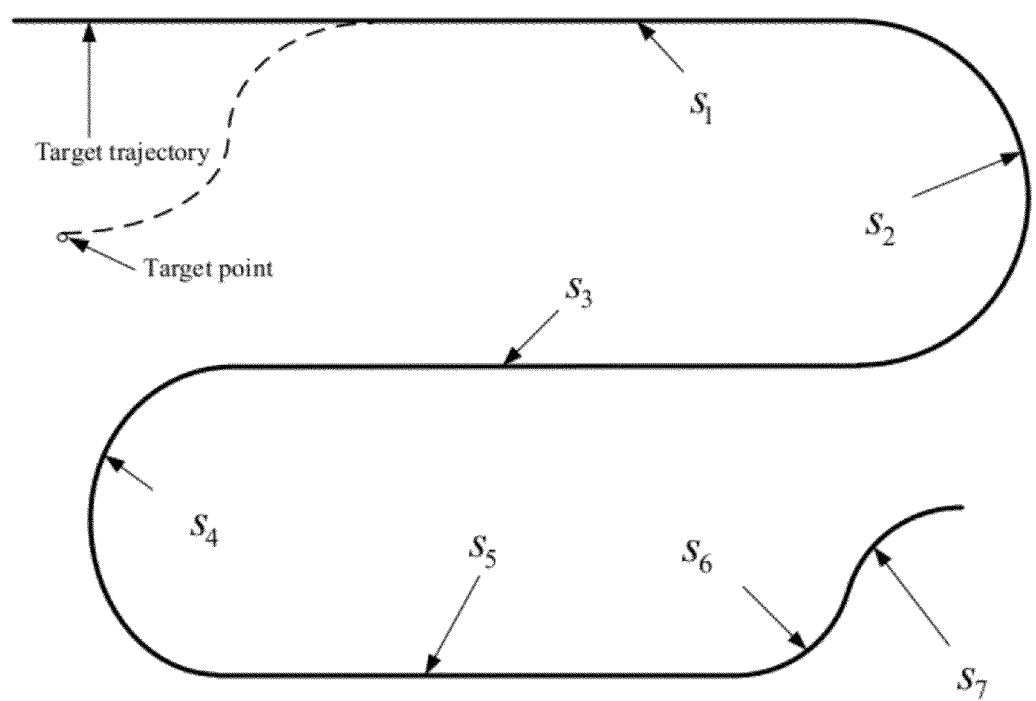
FIG. 6 shows a target trajectory composed of linear and curved segments in accordance with embodiments of the invention.

Target trajectory comprises a desired path of travel of the target point and, in one or more embodiments, can be represented as a collection of linear, circular, curved, nonlinear, and/or spline segments. The target trajectory may be stored in the memory of the controller (included in the vehicle) and is constructed by the path planning procedure described in detail in U.S. application Ser. No. 12/070,333 filed Feb. 15, 2008 by Alexander Pesterev, Lev B. Rapoport, and Michael Tkachenko entitled "Path Approximation for Planar Motion of a Ground Vehicle," which is incorporated herein in its entirety. The target trajectory can be constructed in real time while traveling along the desired path under manual control. The target trajectory can also be constructed with the use of a priori collected geodetic information. FIG. 6 illustrates an example of a target trajectory composed of linear and circular segments. Segments $s_1$, $s_3$, and $s_5$ represent linear segments, and segments $s_2$, $s_4$, $s_6$, and $s_7$ represent circular, curved, or nonlinear segments.

Figure 2:
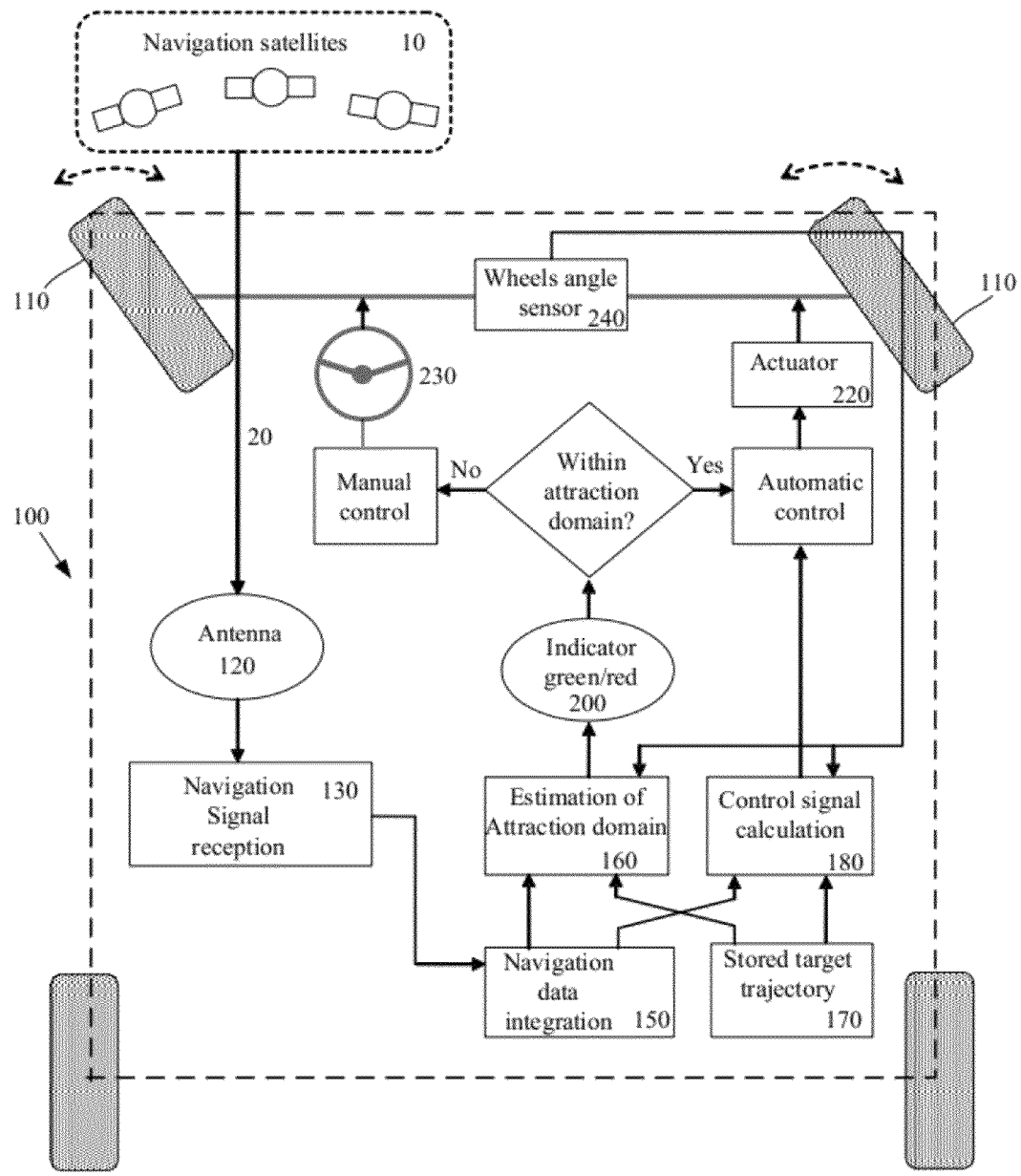
FIG. 2 illustrates components and processing logic included in a land-based automatic navigation vehicle for performing navigation data processing, control law synthesis, and attraction domain indicator in accordance with embodiments of the invention.
Figure 3:
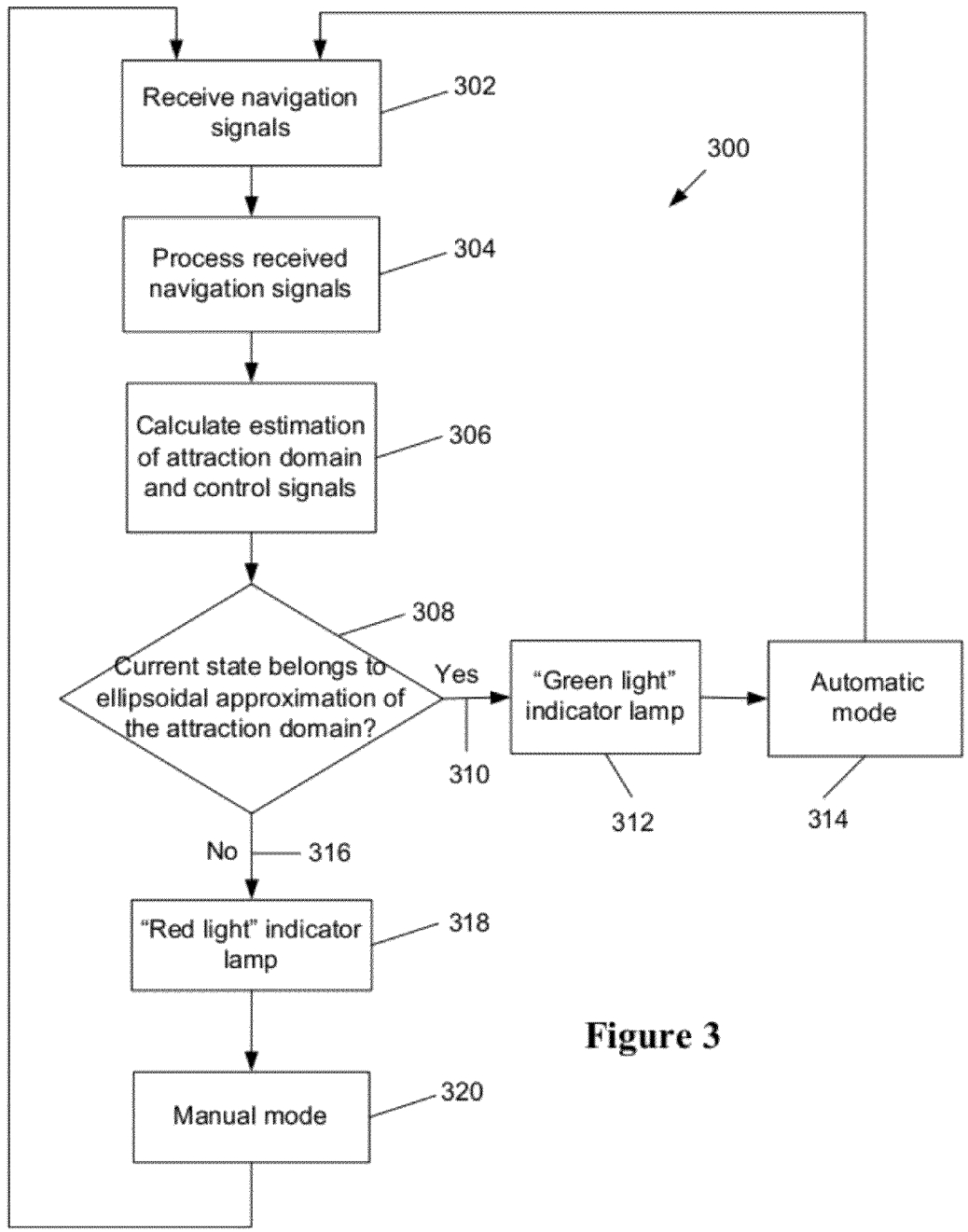
FIG. 3 illustrates a flow diagram for performing navigation data processing, control law synthesis, and attraction domain indication in accordance with embodiments of the invention.

FIGS. 2 and 3 illustrate components and processing logic included in a land-based automatic navigation vehicle for performing navigation data processing, control law synthesis, and attraction domain indicator in accordance with embodiments of the invention. The vehicle 100 is in communication with one or more position determining system 10. The position determining system 10, also referred to as a satellite navigation signaling system or navigation signaling system, may include, but is not limited to, a global positioning system (GPS) and/or GLONASS in a GNSS framework to provide high accuracy positioning of the vehicle 100. The GPS satellite signal standards are provided in detail in *ICD-GPS-200, Revision C*, ARINC Research Corporation, Oct. 10, 1993. Details of the GLONASS signals may be found in *GLONASS ICD, Version* 4.0, 1998. Other navigational signals, such as space, air, or land based signals, may substitute or supplement the GPS and/or GLONASS signals. Examples of vehicles include, but are not limited to, combines, harvesters, tractors, farm vehicles, forklifts, construction vehicles, and the like.

Navigation signals 20 provided by the position determining system 10 are received by an antenna 120 included on the vehicle 100 (block 302 of FIG. 3). The antenna 120 and/or a navigation signal receiver 130 may be mounted at a specific location on the vehicle 100, such as the roof of the vehicle 100, to maximize reception potential. The signal receiver 130 may be a combined GPS and GLONASS navigation receiver. The GNSS-measured position and velocity (from the navigation signals 20) are directed from the signal receiver 130 to a processing apparatus 150 (also referred to as a processor).

Upon receipt of the navigation signals 20, data processing and calculation of estimation of attraction domain and control signals occur at blocks 304, 306 of flow 300. The processing apparatus 150 is configured to smooth out the velocity data using filtering recurrent schemes, such as Kalman filtering, to obtain a body orientation angle. The processing apparatus 150 may perform additional computations or filtering to make the navigation signals 20 suitable for use in calculating one or more estimation of the attraction domain and control signals.

Control signals are calculated in the control signal calculation apparatus 180 using information about position (the position of vehicle 100 may be simplified as a target point for ease of calculations), velocity, body orientation, and steered wheels rotation angle data provided by the processing apparatus 150 and a wheels angle sensor 240. The current or instant position, velocity, and body orientation data associated with the vehicle 100 is provided by the processing apparatus 150. The steered wheels rotation angle is measured by the sensor 240. The position, velocity, body orientation, and steered wheels rotation angle data are also provided to the estimation of attraction domain apparatus 160 to calculate an ellipsoidal estimation of the attraction domain in the parametric state space. Stored target trajectory from a memory 170 (also referred to as storage) is also an input to each of the apparatus 160 and 180.

In alternative embodiments, apparatus 150, 160, and/or 180 can be implemented using a general or special purpose processor such as, for example, a microprocessor, microcontroller, controller, ASIC, or other processing subsystems, modules, components, logic units, or the like, or as a general or special purpose computer or server. Apparatus 150, 160, and 180 may be configured collectively as a single processor, as separate processors, or otherwise be implemented in a computing environment, depending on processing requirements, operating environment, and cost constraints. Each of apparatus 150, 160, and/or 180 can include control logic such as, for example, software instructions, computer program code, or the like, to carry out calculations, filtering, and other processing functions. It is also contemplated that the memory 170 may be included within any of apparatus 150, 160, and/or 180. In alternative embodiments, the functionalities of apparatus 150, 160, 180 and/or memory 170 may be provided remote from the vehicle 100, possibly in a client-server environment.

Front steered wheels 110 are controlled either manually by a steering wheel 230 or automatically by an actuator 220. The actuator 220 can be an electronically controlled hydraulic steering mechanism, which changes the angle of the front wheels 110 based on control signals received from the apparatus 180. The control signals may be received through a data bus like CAN or RS-485 or other communication data buses used in the machine control industry.

If the apparatus 160 estimates the current state of the vehicle 100 as belonging to the ellipsoidal approximation of the attraction domain (block 308 and branch 310), then an indicator lamp 200 is lit green or otherwise indicate to an operator of the vehicle 100 that automatic steering can be safely engaged (thereby closing the control loop) (block 312). Upon such indication of the indicator lamp 200, the operator may activate automatic mode (block 314) and in response, the actuator 220 may take over to automatically steer the vehicle 100. In an alternative embodiment, activation by the operator may not be required to start the automatic mode. Instead, the vehicle 100 may be configured to automatically switch to automatic mode based on inclusion of the current state within the attraction domain.

Otherwise, if the apparatus 160 estimates that the current state does not belong within the ellipsoidal approximation of the attraction domain (block 308 and branch 316), then the indicator lamp 200 is lit red or otherwise indicate to the operator that automatic steering is unsafe (block 318). In this case, the vehicle 100 is steered manually by the operator using the steering wheel 230 (block 320).

This process is repeated periodically or continually to provide up-to-date information regarding whether it is safe to operate the vehicle 100 in automatic steering mode.

It is contemplated that additional actuators, sensors, processors, memories, and other components may be included in the vehicle 100 to facilitate communication with the position determining system 10, perform data processing, sense and control mechanical parts such as the steering wheel and wheels, etc. as required for selective automatic and manual control of the vehicle 100.

Figure 4:
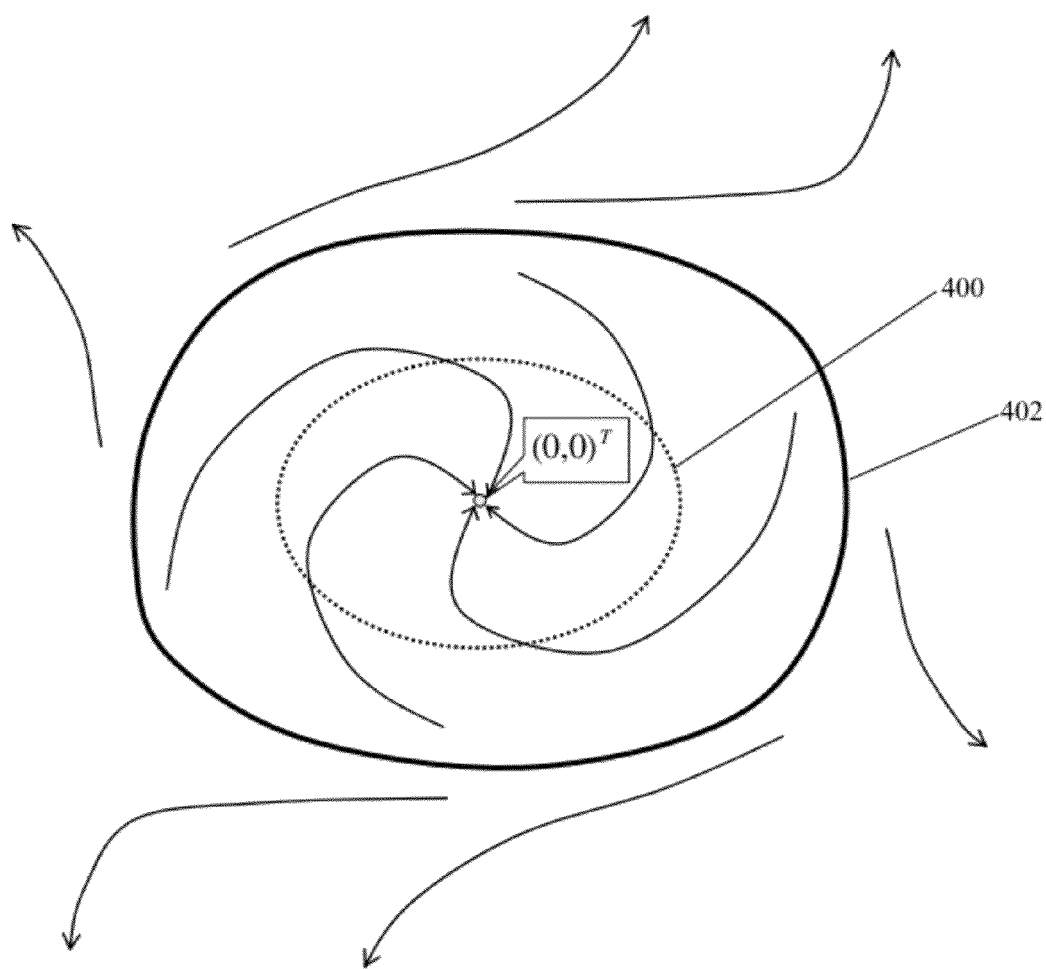
FIG. 4 is a schematic drawing of the ellipsoidal approximation of the attraction domain in the "position-orientation" state space in accordance with embodiments of the invention.

For the two-dimensional case, the movement of the vehicle 100 is governed by differential equations, which can be reduced to the case of two differential equations with respect to two state variables—distance to the target trajectory and tangent of the orientation angle $\theta$ relative to the target trajectory. An example of the collection of solutions of the set of differential equations corresponding to different initial positions and orientation angles (called "phase portrait") is shown in FIG. 4. In FIG. 4, the abscissa axis is the distance from the target trajectory and the ordinate axis is for the tangent of the orientation with respect to the target trajectory. The exact attraction domain is illustrated as a solid black closed form 402. The dashed ellipsoid 400 illustrates an interior approximation of the attraction domain. Trajectories not belonging to the attraction domain diverge.

Every certain solution, depicted on the "position-orientation" plane forms a curvilinear line called a "phase trajectory." As shown in FIG. 4, there are phase trajectories which converge to the origin (0,0). This kind of phase trajectories corresponds to the asymptotically stable motion of the vehicle, tending to the zero distance from the target trajectory and zero angle difference between its body center line and tangent to the target trajectory. The other kind of phase trajectories depicted in FIG. 4 (e.g., those lines outside the closed form 402 of the exact attraction domain) "spin out" of the steady movement mode, indicating instability. The solid black closed line 402 outlines the stability region or attraction domain. The attraction domain is hard to precisely describe. Instead, an interior ellipsoidal approximation of the precise attraction domain (e.g., dashed ellipsoid 402) is calculated and used in embodiments of the invention. The ellipsoidal approximation of the attraction domain is defined by a symmetric positively definite matrix which is easy to store in the controller memory such as a memory included in the apparatus 160 or in the memory 170.

Details for calculating the estimation of the attraction domain and control signals are discussed below.

1. Kinematic Scheme

Figure 5:
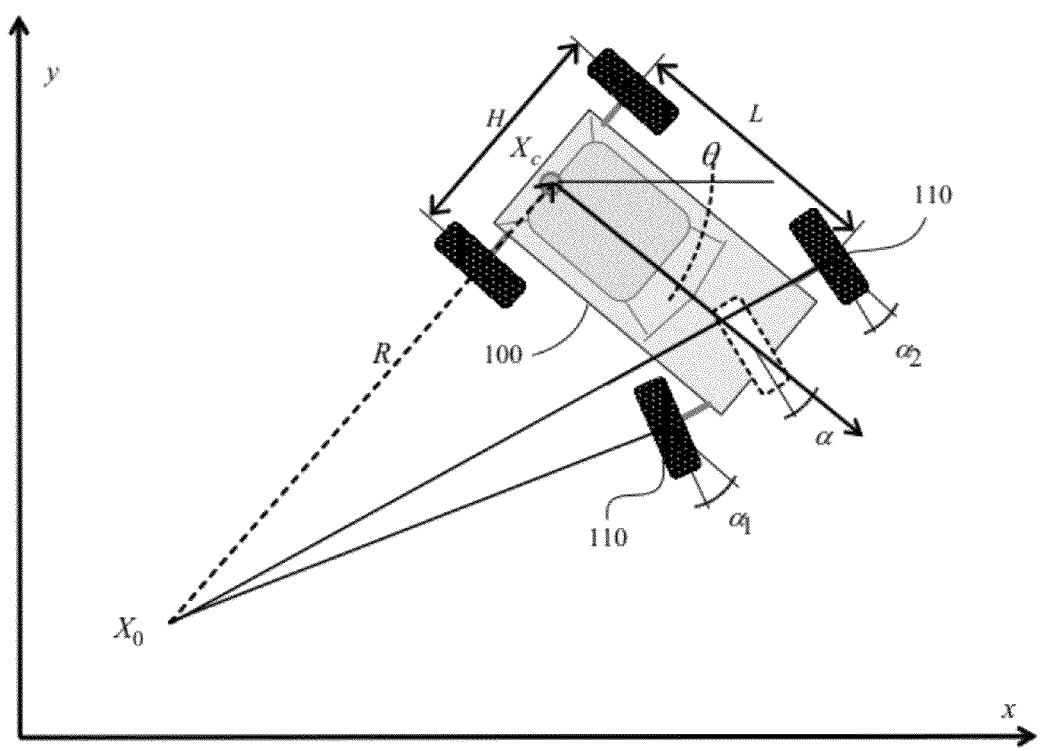
FIG. 5 shows the relationship between the steered wheels angle and curvature of the trajectory of the target point in accordance with embodiments of the invention.

FIG. 5 illustrates a detailed relationship between dimensions of the vehicle 100, wheels rotation angles, and curvature of the trajectory of the target point. The motion of the vehicle 100 is assumed to be two-dimensional and the orientation of the vehicle 100 (also referred to as a robot platform or platform) is defined by a (effective) single angle. The symbol $T$ denotes the matrix transpose, vectors are supposed to be columns, and $X=(x,y)^T$ denotes a point on the two-dimensional plane. The target point is located at the middle of the rear axle of the platform and is denoted by $X_c=(x_c,y_c)^T$. For the planar case the orientation is defined by an angle $\theta$ between the center line of the platform and the x-axis. Every point X of the platform has its own instantaneous velocity vector V. Vectors, orthogonal to the instant velocities intersect a single point $X_0$ known as the instantaneous center of velocity. Let $\dot{\theta}$ be an instantaneous angular rate of the rotation of the platform. Then the following relationship holds:

$$|\dot{\theta}|=\|V\|/\|X-X_0\|. \qquad (1)$$

Hereinafter, $\|\cdot\|$ denotes the Euclidean vector norm. The condition that each of the wheels move without lateral slippage means that the vectors of instantaneous velocities of the axles' endpoints are collinear to the planes of the wheels; the normals to each of these vectors intersect at the point $X_0$.

The two rear wheels are driving and the front wheels are steering. For the case of the movement along a straight line, the point $X_0$ is located at infinity and expression (1) yields zero angular rate. For points of the rear axle the instantaneous center of velocity coincides with the instantaneous center of curvature. Particularly, for the target point the value $\|X_c-X_0\|$ is the instantaneous radius of curvature of the trajectory (dashed line in FIG. 5) circumscribed by the target point $X_c$. The reciprocal to the radius $1/\|X_c-X_0\|$ is the instantaneous curvature denoted by u. Let L and H be dimensions of the platform, as shown in FIG. 5. Then the formulae $$\frac{uL}{1+uH/2}=\tan\alpha_1, \quad \frac{uL}{1-uH/2}=\tan\alpha_2 \qquad (2)$$

relate u to the steering angles of the front wheels. Relationships (2) are obtained from FIG. 5 where the platform is turning right. The same relationships are valid in the case of a left turn. Note that because the counterclockwise direction is taken as positive, a left turn associates with a positive value of curvature u. This value has the opposite sign for a right turn. Relationships (2) allow simplification of the model, and the value u is further taken as control. Denoting $v_c=\|V_c\|$ in the forward motion and $v_c=-\|V_c\|$ in the reverse motion, the following well known model results:

$$\dot{x}_c=v_c\cos\theta,$$

$$\dot{y}_c=v_c\sin\theta,$$

$$\dot{\theta}=v_c u. \qquad (3)$$

The limitations on the steering angle impose two-sided constraints on the value of curvature:

$$-\bar{u}\leq v\leq\bar{u}. \qquad (4)$$

The expression for the quantity $\bar{u}$ is easily derived from the value of the maximum steering angle. Taking constraint (4) into account, equations (3) take the form $$\dot{x}_c=v_c\cos\theta,$$

$$\dot{y}_c=v_c\sin\theta,$$

$$\dot{\theta}=v_c s_{\bar{u}}(u), \qquad (5)$$

where $s_{\bar{u}}(u)$ is the saturation function:

$$s_{\bar{u}}(u)=\begin{cases} -\bar{u} & \text{for } u\leq -\bar{u}, \\ u & \text{for } |u|<\bar{u}, \\ \bar{u} & \text{for } u\geq \bar{u}. \end{cases} \qquad (6)$$

2. Target Trajectory Parametrization

The line segments and circular arcs comprising the target trajectory are referred to as trajectory segments and denoted by $s_i$, $i=1,\ldots,n$, where n is the number of segments. Every segment has a respective curvature $c_i$ and the line segments have zero curvature. The trajectory segments should satisfy the following feasibility condition:

$$|c_i|<\bar{u}. \qquad (7)$$

Let $\xi$ be the length parameter and $l_i$ be the length of the segment $s_i$. A sample trajectory is depicted in FIG. 6. The segments $s_1$, $s_3$, and $s_5$ are linear. The segments $s_2$, $s_4$, $s_6$, and $s_7$ are circular (or curved or nonlinear). The curvature of a circular segment is positive if motion along it leads to counterclockwise rotation as the parameter $\xi$ increases; the curvature is negative otherwise. Accordingly in FIG. 6, $c_4>0$, $c_6>0$, $c_2<0$, and $c_7<0$.

During motion in the neighborhood of the trajectory, one of the segments is considered current at any given time. The motion equations (5) are further rewritten in the form where the parameter is taken as an independent variable. Motion along the current segment $s_i$ is considered started if the parameter $\xi$ exceeds the value $b_i$ such that $$b_1=0, b_i=b_{i-1}+l_{i-1} \text{ for } i=2,\ldots,n, \qquad (8)$$

and it is considered terminated as soon as $\xi$ exceeds the value $b_{i+1}$. After motion along (or approximate to) the segment $s_i$ is over, the segment $s_{i+1}$ becomes current. The following assumption is preferably satisfied.

Assumption 1. Adjacent segments have a common tangent at their connection point

The turn to the current segment is accompanied by abrupt change of curvature $c_i$, which, in turn, necessitates the abrupt change of the control u or, according to formulas (2), that of the steering angle of the front wheels. In the situations where the dynamics of the front wheel drive cannot be neglected (in contrast to what was assumed further), the turn from one segment to another is accompanied by transition processes.

3. Change of Variables

Below, the change of variables is considered separately for the two cases where the segment of the target trajectory is a line segment or a circular segment.

3.1. Motion Along Line Segments

A current line segment $s_i$ is specified by its initial point $X_b$ and the terminal point $X_e \neq X_b$. The direction unit vector is $l=(X_e-X_b)/(\|X_e-X_b\|)=(l_x,l_y)^T$, and the normal vector pointing to the left is given by $n=(-l_y,l_x)^T$. By changing the variables $$X_c=X_b+(\xi-b_i)l+\eta n, \; \theta=\psi+\arctan l_y/l_x \qquad (9)$$

expression (3) reduces to the following:

$$\dot\xi=v_c\cos\psi,$$

$$\dot\eta=v_c\sin\psi,$$

$$\dot\psi=v_c u. \qquad (10)$$

In the new variables, the control goal is to ensure $\eta\to 0$. The following assumptions are assumed.

Assumption 2. The linear velocity of the platform $v_c(t)$ is positive $$v_c(t)\geq v_0>0, \qquad (11)$$

and satisfies the existence conditions for absolutely continuous solutions of the system of differential equations (10).

Assumption 3. Along the trajectories of the controlled system (10), the following relation holds:

$$\cos\psi(t)\geq\epsilon>0. \qquad (12)$$

As will be shown, if this assumption is satisfied at the initial state it will hold along the whole trajectory.

Further, take the variables $z_0=\xi$, $z_1=\eta$, and $z_2=\tan\psi$ and replace derivative with respect to time by derivative with respect to $\xi$. The variable $z_0=\xi$ corresponds to the projection of the target point on the linear segment and will be taken as a parameter of the segment length. In this case $c_i=0$ and $l_i=\|X_e-X_b\|$. The variable $z_1=\eta$ corresponds to the side deviation from target trajectory.

By the first equation in (10) and Assumptions 2 and 3, the variable $\xi$ varies monotonically. Let ' denote derivatives with respect to the variable $\xi$; then (10) re-writes into:

$$z'_0=1, \qquad (13)$$

$$z'_1=z_2,$$

$$z'_2=u(1+z_2^2)^{\frac{3}{2}}$$

The first differential equation in (13) is trivial and can be removed. Thus, equations (13) become $$z'_1=z_2, \qquad (14)$$

$$z'_2=u(1+z_2^2)^{\frac{3}{2}}.$$

Let $z=(z_1,z_2)^T$. Starting from the initial value of the parameter $\xi=b_i$ and the initial state $z(b_i)$ the current linear segment is terminated when the independent variable $\xi$ exceeds the value $b_i+l_i$.

3.2. Motion Along Circular Arcs or Segments

Figure 7:
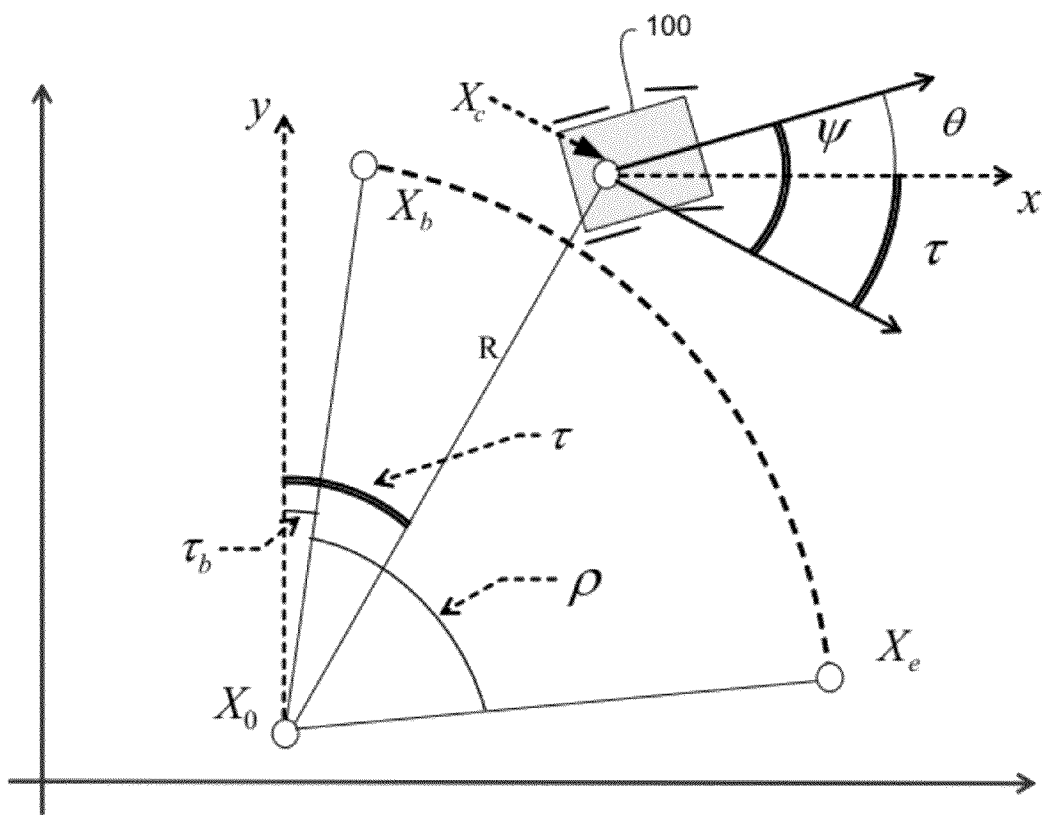
FIG. 7 describes a kinematic scheme of the wheeled vehicle in the context of a circular target trajectory in accordance with embodiments of the invention.

A current circular segment $s_i$ is specified by the center $X_0$, initial point $X_b$, radius R, angular size $\rho>0$, and a direction the angular size is counted in. FIG. 7 illustrates the case of the negative direction. In this case, $c_i=-1/R$ and $l_i=\rho R$. The case of the positive direction is analyzed in a similar way.

With respect to FIG. 7, $$\tau=\arctan\left(\frac{x_0-x_c}{y_c-y_0}\right)$$

denotes the angle between the x-axis and the normal to the radius-vector $X_c-X^0$ directed to the negative direction;

$$\tau_b=\arctan\left(\frac{x_0-x_b}{y_b-y_0}\right)$$

denotes the angle between the x-axis and the normal to the radius-vector $X_b-X_0$ directed to the negative direction; and $\psi$ denotes the angle between the centroidal axis of the platform and the normal to the radius-vector $X_c-X_0$. By changing the variables as follows, $$\eta=\sqrt{(x_c-x_0)^2+(y_c-y_0)^2},$$

$$\xi=b_i-(\tau-\tau_b)R,$$

$$\psi=\theta-\tau, \qquad (15)$$

equations (3) may be rewritten in the following form $$\dot\xi=v_c\frac{R}{\eta}\cos\psi \qquad (16)$$

$$\dot\eta=v_c\sin\psi,$$

$$\dot\psi=v_c u+\frac{v_c}{\eta}\cos\psi.$$

Continuing use of Assumptions 2 and 3 from the previous section, denote $z_0=\xi$, $z_1=\eta-R$, and $z_2=\tan\omega$. Also, let ' denote the derivative with respect to the variable $\xi$. Then the differential equations of the system take the form:

$$z'_0 = 1, \tag{17}$$
$$z'_1 = \left(\frac{z_1}{R} + 1\right)z_2,$$
$$z'_2 = u\left(\frac{z_1}{R} + 1\right)(1 + z_2^2)^{\frac{3}{2}} + \frac{1}{R}(1 + z_2^2).$$

Using reasoning similar to that used in the previous subsection and taking into account $c_i = -1/R$, differential equations of the system become $$z'_1 = (1 - c_i z_1)z_2, \tag{18}$$
$$z'_2 = u(1 - c_i z_1)(1 + z_2^2)^{\frac{3}{2}} - c_i(1 + z_2^2).$$

For the case of the positive direction $$c_i = \frac{1}{R},$$
$$\tau = \arctan\left(\frac{x_c - x_0}{y_0 - y_c}\right), \tau_b = \arctan\left(\frac{x_b - x_0}{y_0 - y_b}\right),$$
$$\psi = \theta - \tau, z_1 = R - \eta, z_2 = \tan\psi.$$

and the same differential equations (18) govern the motion of the system or platform.

Starting from the initial value of the parameter $\xi = b_i$ and the initial state $z(b_i)$, the current circular segment is terminated when the independent variable $\xi$ exceeds the value $b_i + l_i$.

Summing up results of subsections 3.1 and 3.2 and taking into account Assumption 1, the following equations describe the system's motion along the target trajectory:

$$z'_1 = (1 - c(\xi)z_1)z_2, \tag{19}$$
$$z'_2 = u(1 - c(\xi)z_1)(1 + z_2^2)^{\frac{3}{2}} - c(\xi)(1 + z_2^2),$$

where the quantity $c(\xi)$ takes values $c_i$ when the current segment becomes $s_i$ according to the condition $$b_i \leq \xi \leq b_{i+1}.$$

The value $\xi$ is easily calculated for the current segment using relationships (9) or (15) and real time measurements of the position and orientation.

4. Control Law Design

The choice of control u in equations (19) in the form $$u = -\frac{\sigma - c(\xi)(1 + z_2^2)}{(1 - c(\xi)z_1)(1 + z_2^2)^{\frac{3}{2}}}, \tag{20}$$

for some $\lambda > 0$ and $$\sigma = 2\lambda z_2 + \lambda^2 z_1 \tag{21}$$

leads to the differential equations of the closed loop system $$z'_1 = (1 - c(\xi)z_1)z_2,$$
$$z'_2 = -\sigma. \tag{22}$$

If $c(\xi) = 0$, this system is equivalent to $z''_2 + 2\lambda z'_2 + \lambda^2 z_2 = 0$ which implies the exponential convergence rate of $z_1$ and $z_2$. In the small enough neighborhood of zero the term $c(\xi)z_1 z_2$ is negligible and the zero solution of the system expressed in equations (22) is also exponentially stable with the exponent of stability $-\mu$ where $0 < \mu < \lambda$. However, in general, control (20) does not satisfy the two-sided constraints (4). On the other hand, taking control in the form $$u = -s_{\overline{u}}\left(\frac{\sigma - c(\xi)(1 + z_2^2)}{(1 - c(\xi)z_1)(1 + z_2^2)^{\frac{3}{2}}}\right), \tag{23}$$

may not guarantee that $z_1$ and $z_2$ decrease exponentially.

A vector function $z(\xi)$ is said to be decreasing exponentially with a rate $-\mu$ for $\xi \geq 0$ if there exists a quadratic form $$V(z) = z^T P z \tag{24}$$

with $P > 0$ and $P^T = P$ such that the following inequality holds:

$$\frac{dV(z(\xi))}{d\xi} + 2\mu V(z(\xi)) \leq 0, \xi \geq 0. \tag{25}$$

Rewriting the last equation in (19) taking the control u as (23)

$$z'_2 = -s_{\overline{u}}\left(\frac{\sigma - c(\xi)(1 + z_2^2)}{(1 - c(\xi)z_1)(1 + z_2^2)^{\frac{3}{2}}}\right)(1 - c(\xi)z_1)(1 + z_2^2)^{\frac{3}{2}} - c(\xi)(1 + z_2^2) \doteq -\Phi(z, \sigma).$$

Then $$\Phi(z, \sigma) = s_{\overline{u}(1 - c(\xi)z_1)(1 + z_2^2)^{\frac{3}{2}}}(\sigma - c(\xi)(1 + z_2^2)) + c(\xi)(1 + z_2^2) \tag{26}$$

and the system (19) takes the form $$z'_1 = (1 - c(\xi)z_1)z_2,$$
$$z'_2 = -\Phi(z, \sigma). \tag{27}$$

5. Estimation of the Attraction Domain

Initial conditions $z^0$ for which $z(\xi)$ decreases exponentially with a rate $-\mu$, where $0 < \mu \leq \lambda$, along the trajectories of system (19) will be determined. To estimate this domain of initial conditions, which will be denoted by $\Omega(\mu)$, the Lyapunov function (24) will be used in the framework of the absolute stability approach. Let $$\Omega_0(P) = \{z : V(z) \leq 1\}. \tag{28}$$

Given positive values $\alpha_1$ and $\alpha_2$ the matrix P will be sought in the class of matrices satisfying the matrix inequalities $$P \geq \begin{bmatrix} \frac{1}{\alpha_1^2} & 0 \\ 0 & 0 \end{bmatrix}, P \geq \begin{bmatrix} 0 & 0 \\ 0 & \frac{1}{\alpha_2^2} \end{bmatrix}, \tag{29}$$

meaning that the desired domain $\Omega_0(P)$ is inscribed in the rectangle $$\Pi(\alpha_1, \alpha_2) = \{z : -\alpha_1 \leq z_1 \leq \alpha_1, -\alpha_2 \leq z_2 \leq \alpha_2\} \tag{30}$$

The values of $\mu$, $\alpha_1$, and $\alpha_2$ are characterized such that they guarantee $$\Omega_0(P) \subseteq \Omega(\mu), \Omega_0(P) \subseteq \Pi(\alpha_1, \alpha_2) \quad (31)$$

for some matrix P>0. And denote $d=(\lambda^2, 2\lambda)^T$ and $$\bar{c} = \limsup_{i=1,2,\ldots} |c_i|. \quad (32)$$

The following auxiliary assertion holds:
Suppose that for a matrix P satisfying (29) and a number $\alpha_1$ satisfying the inequality $$u_0 \doteq \bar{u}(1-\bar{c}\alpha_1) - \bar{c} > 0, \quad (33)$$

the inclusion $$z \in \Omega_0(P) \quad (34)$$

is valid. Then the following inequalities hold $$-\sigma_0 \leq \sigma \leq \sigma_0, \quad (35)$$

$$s_{u_0}(\sigma) \leq \Phi(z,\sigma) \leq \sigma, \quad (36)$$

where $$\sigma_0 = \sqrt{d^T P^{-1} d}. \quad (37)$$

Along with the function $\Phi(z,\sigma)$ in the formulation of system (27), introduce the function $$\phi(\xi,\sigma) = \beta(\xi)\sigma, \quad (38)$$

where $\beta(\xi)$ satisfies the conditions $$k_0 \leq \beta(\xi) \leq 1, k_0 = \min\left\{\frac{u_0}{\sigma_0}, 1\right\}. \quad (39)$$

According to the absolute stability approach the graph of the function $\Phi(z,\sigma)$, satisfying the conditions (36), is inscribed into a "sector" on the plane $\sigma$–$\Phi$ for values $\sigma$ satisfying conditions (35). Conditions (39) define the size of the sector. Further, introduce the function $\gamma(\xi)$ satisfying the conditions $$(1-\bar{c}\alpha_1) \leq \gamma(\xi) \leq (1+\bar{c}\alpha_1). \quad (40)$$

Next, expand the class of systems (27) by considering systems of the form $$z'_1 = \gamma(\xi) z_2,$$

$$z'_2 = -\beta(\xi)\sigma. \quad (41)$$

And require that the functions $\beta(\xi)$ and $\gamma(\xi)$ satisfy the existence conditions of absolutely continuous solution of system (41). If system (41) possesses the following property $$V'(z) + 2\mu V(z) \leq 0 \quad (42)$$

for all functions $\beta(\xi)$ and $\gamma(\xi)$ satisfying conditions (39) and (40), then property (42) also holds along the trajectories of system (27) satisfying (34).

Consider the following matrices $$A_{\beta\gamma} = \begin{bmatrix} 0 & \gamma \\ -\beta\lambda^2 & -2\beta\lambda \end{bmatrix}. \quad (43)$$

Suppose now that given numbers $\alpha_1 > 0$ satisfying (33), $\alpha_2 > 0$, and $\mu > 0$ there exists $0 < \beta \leq 1$ such that the following linear matrix inequalities in the variable P are feasible:

$$PA_{\beta(1-\bar{c}\alpha_1)} + A^T_{\beta(1-\bar{c}\alpha_1)} P + 2\mu P \leq 0,$$

$$PA_{\beta(1+\bar{c}\alpha_1)} + A^T_{\beta(1+\bar{c}\alpha_1)} P + 2\mu P \leq 0,$$

$$PA_{1(1-\bar{c}\alpha_1)} + A^T_{1(1-\bar{c}\alpha_1)} P + 2\mu P \leq 0,$$

$$PA_{1(1+\bar{c}\alpha_1)} + A^T_{1(1+\bar{c}\alpha_1)} P + 2\mu P \leq 0, \quad (44)$$

$$\begin{bmatrix} P & \vdots & d \\ d^T & \vdots & \frac{(\bar{u}(1-\bar{c}\alpha_1)-\bar{c})^2}{\beta^2} \end{bmatrix} > 0, \quad (45)$$

$$P \geq \begin{bmatrix} \frac{1}{\alpha_1^2} & 0 \\ 0 & 0 \end{bmatrix}, P \geq \begin{bmatrix} 0 & 0 \\ 0 & \frac{1}{\alpha_2^2} \end{bmatrix}, \quad (46)$$

Then the domain $\Omega_0(P)$ is an attraction domain of system (19) under control (23); moreover, conditions (31) hold.

Numerical methods for testing the feasibility of LMI can be used. Under the conditions of Theorem 1, the set $\Omega_0(P)$ is invariant, since the function $V(z(\xi))$ is exponentially decreasing. It therefore follows that over the trajectories of system (19) subjected to control (23), the quantity $z_2^2 = \tan^2\psi(\xi)$ is bounded by $\alpha_2^2$. Hence, $$\cos^2\psi(\xi) \geq \frac{1}{1+\alpha_2^2}$$

and $\cos\psi(\xi)$ does not change sign. If the condition $$\cos\psi(0) \geq \frac{1}{(1+\alpha_2^2)^{\frac{1}{2}}} > 0,$$

is satisfied at the initial time instant, then it remains valid for all $\xi \geq 0$. Thus, the condition of Assumption 3 holds.

Figure 8:
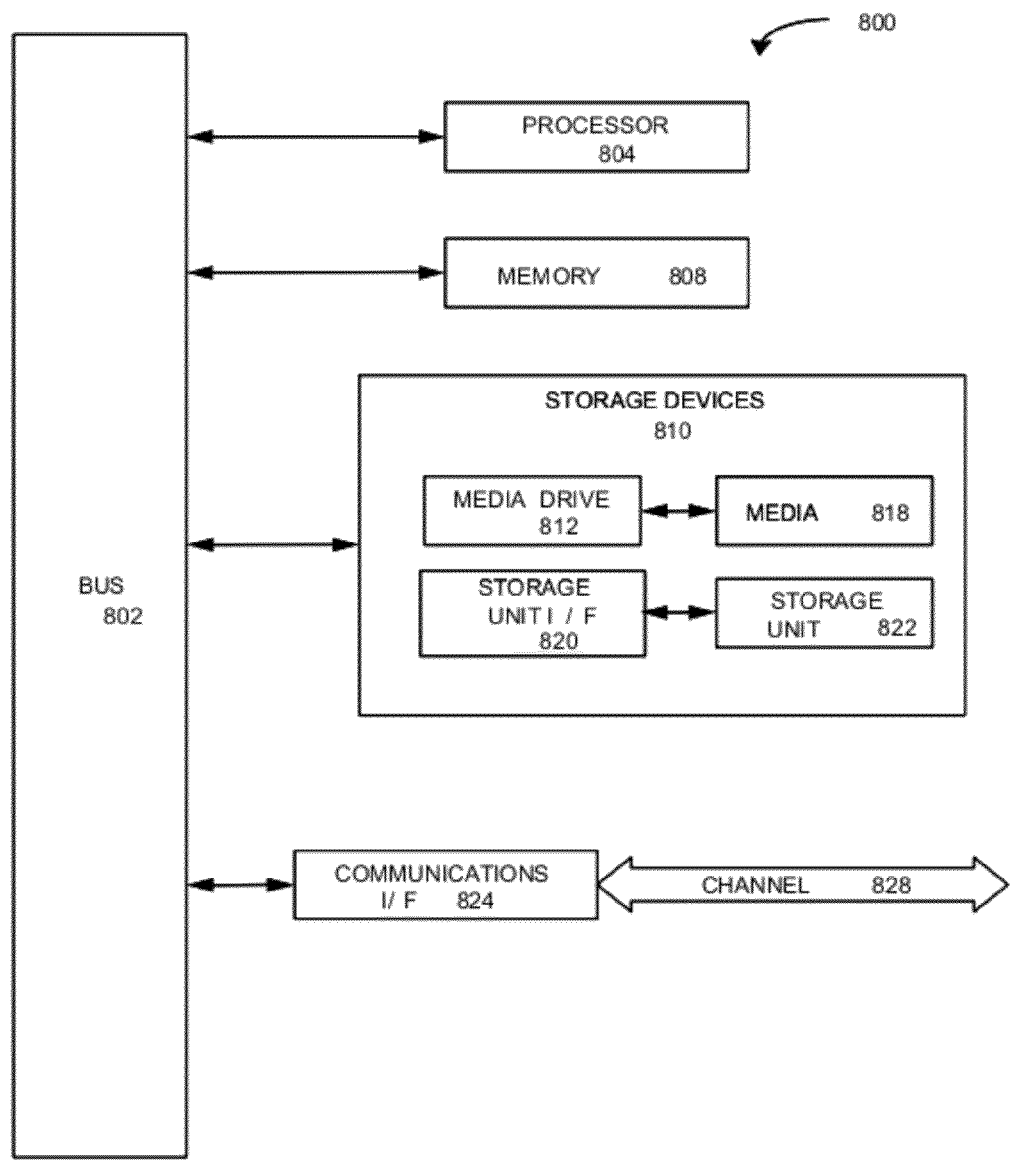
FIG. 8 illustrates a computing system that may be employed to implement processing functionalities in accordance with embodiments of the invention.

FIG. 8 illustrates a typical computing system 800 that may be employed to implement processing functionality in embodiments of the invention. For example, to process the navigation data, calculate the estimation of the attraction domain, and/or calculate the control signals. Those skilled in the relevant art will also recognize how to implement the invention using other computer systems or architectures. Computing system 800 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 800 can include one or more processors, such as a processor 804. Processor 804 can be implemented using a general or special purpose processing engine such as, for example, a microprocessor, microcontroller or other control logic. In this example, processor 804 is connected to a bus 802 or other communication medium.

Computing system 800 can also include a main memory 808, such as random access memory (RAM) or other dynamic memory, for storing information and instructions to be executed by processor 804. Main memory 808 also may be used for storing temporary variables or other intermediate information during execution of instructions to be executed by processor 804. Computing system 800 may likewise include a read only memory (ROM) or other static storage device coupled to bus 802 for storing static information and instructions for processor 804.

The computing system 800 may also include information storage system 810, which may include, for example, a media drive 812 and a removable storage interface 820. The media drive 812 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 818 may include, for example, a hard disk, floppy disk, magnetic tape, optical disk, CD or DVD, or other fixed or removable medium that is read by and written to by media drive 812. As these examples illustrate, the storage media 818 may include a computer-readable storage medium having stored therein particular computer software or data.

In alternative embodiments, information storage devices 810 may include other similar components for allowing computer programs or other instructions or data to be loaded into the computing system 800. Such components may include, for example, a removable storage unit 822 and a storage unit interface 820, such as a program cartridge and cartridge interface, a removable memory (for example, a flash memory or other removable memory module) and memory slot, and other removable storage units 822 and interfaces 820 that allow software and data to be transferred from the removable storage unit 818 to the computing system 800.

Computing system 800 can also include a communications interface 824. Communications interface 824 can be used to allow software and data to be transferred between computing system 800 and external devices. Examples of communications interface 824 can include a modem, a network interface (such as an Ethernet or other NIC card), a communications port (such as for example, a USB port), a PCMCIA slot and card, etc. Software and data transferred via communications interface 824 are in the form of signals which can be electronic, electromagnetic, optical, or other signals capable of being received by communications interface 824. These signals are provided to communications interface 824 via a channel 828. This channel 828 may carry signals and may be implemented using a wireless medium, wire or cable, fiber optics, or other communications medium. Some examples of a channel include a phone line, a cellular phone link, an RF link, a network interface, a local or wide area network, and other communications channels 828 to perform features or functions of embodiments of the invention. Note that the code may directly cause the processor to perform specified operations, be compiled to do so, and/or be combined with other software, hardware, and/or firmware elements (e.g., libraries for performing standard functions) to do so.

In this document, the terms "computer program product," "computer-readable medium," and the like may be used generally to refer to media such as, for example, memory 808, storage device 818, or storage unit 822. These and other forms of computer-readable media may be involved in storing one or more instructions for use by processor 804, to cause the processor to perform specified operations. Such instructions, generally referred to as "computer program code" (which may be grouped in the form of computer programs or other groupings), when executed, enable the computing system 800 to perform features or functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 800 using, for example, removable storage drive 814, drive 812 or communications interface 824. The control logic (in this example, software instructions or computer program code), when executed by the processor 804, causes the processor 804 to perform the functions of the invention as described herein.

It will be appreciated that, for clarity purposes, the above description described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Moreover, it will be appreciated that various modifications and alterations may be made by those skilled in the art without departing from the spirit and scope of the invention. The invention is not to be limited by the foregoing illustrative details, but is to be defined according to the claims.

Although only certain exemplary embodiments have been described in detail above, those skilled in the art will readily appreciate that many modifications are possible in the exemplary embodiments without materially departing from the novel teachings and advantages of this invention. Accordingly, all such modifications are intended to be included within the scope of this invention.

The following articles are incorporated herein in their entirety:

[1] A. V. Pesterev, L. B. Rapoport, R. F. Gilimyanov, "Global Energy Fairing of B-Spline Curves in Path Planning Problems," Proceedings of the ASME 2007 International Design Engineering Technical Conference & Computers and Engineering Conference IDETC/CIE 2007, Sep. 4-7, 2007, Las Vegas, Nev., USA., CD ROM. 7 p. DETC2007-35306.

[2] L. B. Rapoport, et al., "Control of Wheeled Robots Using GNSS and Inertial Navigation: Control Law Synthesis and Experimental Results," In Proc. ION GNSS 2006, The 19th International Technical Meeting, pages 2214-222, 2006.

[3] E. S. Pyatnitskii, "Absolute Stability of Time-Varying Nonlinear Systems," Automation and Remote Control, V. 31, pages 1-9, 1970.

[4] L. B. Rapoport, "Estimation of an Attraction Domain for Multivariable Lur'e Systems Using Looseless Extention of the S-Procedure," In Proc. Amer. Control Conference, pages 2395-2396, 1999.

[5] S. Boyd, L. E. Ghaoui, E. Feron, V. Balakrishnan, "Linear matrix inequalities in system and control theory," SIAM, Philadelphia, 1994.

[6] L. B. Rapoport, Yu. V. Morozov, "Estimation of Attraction Domains in Wheeled Robot Control Using Absolute Stability Approach" (to be published in IFAC'2008 World Congress)

What is claimed is:

1. A method for providing stability indication of an automatic steered vehicle moving along a predefined path, comprising:
    calculating an estimation of an attraction domain of stability; and
    providing an indication for automatic steering of the vehicle based on the estimation of the attraction domain.

2. The method of claim 1, wherein calculating the estimation of the attraction domain comprises calculating the estimation of the attraction domain using position data associated with the vehicle, orientation data associated with the vehicle, and a steered wheels angle associated with the vehicle.

3. The method of claim 1, wherein calculating the estimation of the attraction domain comprises calculating the estimation of the attraction domain using position data associated with the vehicle, orientation data associated with the vehicle, a steered wheels angle associated with the vehicle, and the predefined path.

4. The method of claim 1, wherein the estimation of the attraction domain comprises an ellipsoidal estimation of the attraction domain.

5. The method of claim 1, further comprising calculating a control signal based on position data associated with the vehicle, velocity data associated with the vehicle, orientation data associated with the vehicle, a steered wheels angle associated with the vehicle, and the predefined path.

6. The method of claim 1, wherein the steered wheels angle takes into account a differential in the angle of rotation of front wheels of the vehicle.

7. The method of claim 1, further comprising determining whether the vehicle belongs to the calculated estimation of the attraction domain.

8. The method of claim 7, wherein providing the indication for automatic steering comprises indicating automatic mode when the vehicle belongs to the calculated estimation of the attraction domain.

9. The method of claim 7, wherein providing the indication for automatic steering comprises indicating manual mode when the vehicle does not belong to the calculated estimation of the attraction domain.

10. The method of claim 1, further comprising receiving at least one of the position data associated with the vehicle, orientation data associated with the vehicle, or velocity data associated with the vehicle.

11. The method of claim 1, wherein calculating the estimation of the attraction domain and providing the indication for automatic steering are repeated periodically or continually.

12. An apparatus to efficiently position an automatic steering vehicle to move along a predefined path, comprising:
    a processor operable to calculate an estimation of an attraction domain using a current position of the vehicle, a current orientation of the vehicle, and a current steered wheels angle of the vehicle, and further operable to generate a control signal associated with deviation of the vehicle from the predefined path.

13. The apparatus of claim 12, wherein the estimation of the attraction domain comprises an ellipsoidal estimation of the attraction domain.

14. The apparatus of claim 12, wherein the processor is located remote from the vehicle.

15. The apparatus of claim 12, wherein the processor is located in the vehicle.

16. The apparatus of claim 12, wherein the processor is operable to process navigation data received from a positioning system, the navigation data comprising at least the current position of the vehicle.

17. The apparatus of claim 16, wherein the positioning system comprises a satellite positioning system.

18. The apparatus of claim 16, wherein the navigation data is processed suitable to calculate the estimation of the attraction domain or to generate the control signal.

19. The apparatus of claim 12, comprising a memory storing data representative of the predefined path.

20. The apparatus of claim 12, wherein calculation of the estimation of the attraction domain includes using the predefined path.

21. A non-transitory computer-readable storage medium comprising computer executable instructions for providing stability indication of an automatic steered vehicle moving along a target trajectory, the instructions comprising instructions for:
    generating an estimation of an attraction domain; and
    generating a control signal representative of deviation of a current state of the vehicle from the target trajectory.

22. The computer-readable storage medium of claim 21, wherein generating the estimation of the attraction domain comprises generating an inner ellipsoidal estimation of the attraction domain.

23. The computer-readable storage medium of claim 21, wherein generating the control signal comprises generating the control signal using feedback linearization.

24. The computer-readable storage medium of claim 21, the instructions further comprising instructions for:
    generating an indication of stability to automatically steer the vehicle; and
    automatically steering the vehicle using the control signal.

25. The computer-readable storage medium of claim 21, wherein generating the estimation of the attraction domain is based on position data associated with the vehicle.

26. The computer-readable storage medium of claim 21, wherein generating the estimation of the attraction domain is based on orientation data associated with the vehicle.

27. The computer-readable storage medium of claim 21, wherein generating the estimation of the attraction domain is based on a steered wheels angle associated with the vehicle.

28. The computer-readable storage medium of claim 21, wherein generating the estimation of the attraction domain is based on the predefined path.

* * * * *